2 Sheets Sheet 1

J. Armstrong Jr.,

Corn Planter.

No. 3630. Reissued Sept. 7. 1869.

Witnesses.
R. Campbell
Julius Hirsch

Inventor.
James Armstrong Jr.
by
Mann, Fenwick & Lawrence

H. PETERS, PHOTO-LITHOGRAPHER, WASHINGTON, D. C.

2 Sheets Sheet 2
J. Armstrong Jr.,
Corn Planter.
No. 3630. Reissued Sept. 7. 1869.
Fig. 3.
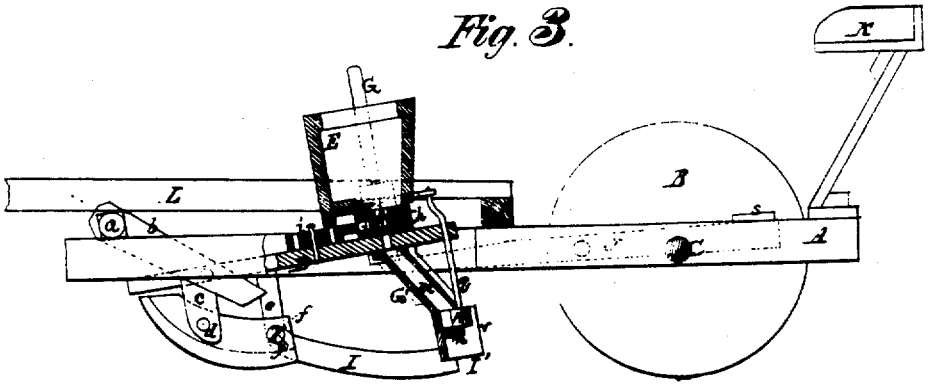
Fig. 4
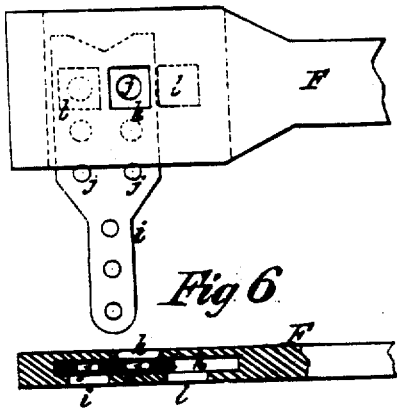
Fig. 5
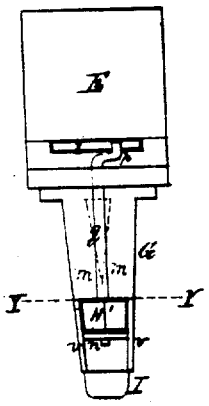
Fig. 6
Fig. 7
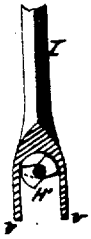
Witnesses.
R. T. Campbell
Julius Hirsch
Inventor
James Armstrong Jr.
by
Marcus Fenwick & Sawyer
H. PETERS, PHOTO-LITHOGRAPHER, WASHINGTON, D. C.

UNITED STATES PATENT OFFICE.

JAMES ARMSTRONG, JR., OF ELMIRA, ILLINOIS.

IMPROVEMENT IN CORN-PLANTERS.

Specification forming part of Letters Patent No. 35,914, dated July 22, 1862; Reissue No. 3,630, dated September 7, 1869.

*To all whom it may concern:*

Be it known that I, JAMES ARMSTRONG, Jr., of Elmira, in the county of Stark and State of Illinois, have invented a new and Improved Corn-Planter; and I do hereby declare that the following is a full, clear, and exact description thereof, reference being had to the accompanying drawings, making part of this specification, in which—

Figure 1:
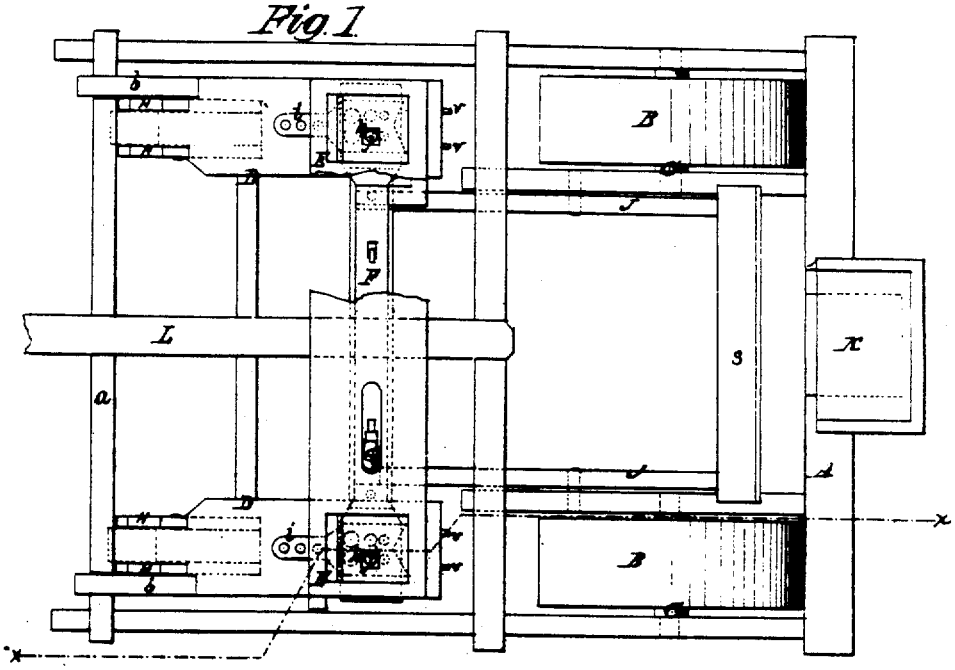
Figure 2:
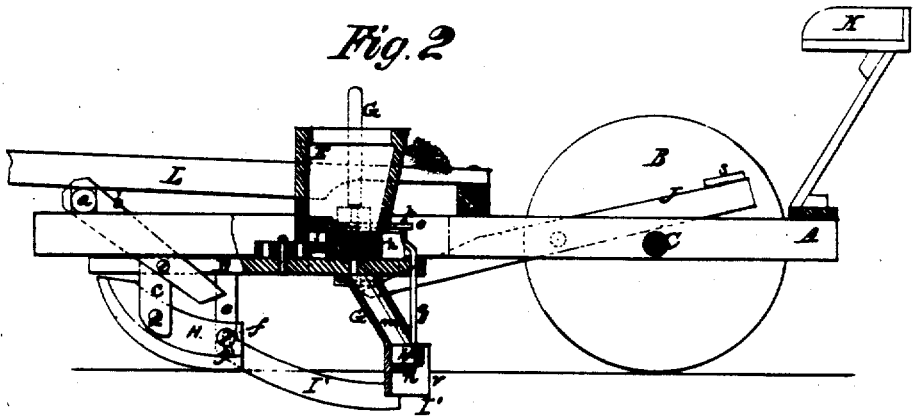

Figure 1, Plate 1, is a top view of the improved machine with portion of the seat-board which connects the two seed-hoppers broken away to expose the seed-slide beneath. Fig. 2, Plate 1, is a vertical section taken through Fig. 1 in the direction indicated by the course of dotted line *x x*, showing the parts in position for operation. Fig. 3, Plate 2, is a similar view of the same parts shown in Fig. 2, indicating the secondary frame and its attachments raised. Fig. 4, Plate 2, is a top view of one end of the seed-slide and a drop-plate applied thereto. Fig. 5, Plate 2, is a rear end view of a seed-tube, its hopper, and a dropping device. Fig. 6, Plate 2, is a vertical section taken centrally through Fig. 4. Fig. 7, Plate 2, is a section taken through a seed-discharging tube in the horizontal plane indicated by dotted line *y y* in Fig. 5.

Similar letters of reference indicate corresponding parts in the several figures.

This invention relates to certain novel improvements on machinery which is designed for planting corn, said improvements consisting, first, in applying the furrow-openers or colters and the seed-distributing devices to a secondary frame, which is pivoted at its front end to the front end of a main or transporting frame, having the draft-pole rigidly attached to it, so that the rear end of the secondary frame will be allowed to rise and descend, and accommodate itself to the undulations of the surface passed over, and in combining with such arrangement a treadle-frame which is pivoted to the main frame in front of the axles of the transporting-wheels, and which has its arms extended forward and backward in such manner as to afford a person mounted upon said main frame a convenient means for raising the rear end of the secondary frame free from the ground, as will be hereinafter explained; second, in the employment of inclined adjustable runners in combination with colters, when these parts are so constructed that the weight of the front parts of the machine is supported by runners upon the ground, and the runners are made to serve as gages for regulating the depth which it may be desired to run the colters in the ground, as will be hereinafter explained; third, in constructing a recess at the termination of the discharging channel or channels of each seed-tube, and arranging in such recess a horizontally-oscillating seed discharger or valve, and also a horizontal shelf, in such manner that after the seeds are dropped from the hopper upon the said shelf they will be swept horizontally therefrom by the valve, and delivered into the furrow, as will be hereinafter explained; fourth, in constructing upon or applying to each end of a seed-slide double discharging perforated slides or cut-offs having interposed between them a stationary but transversely-adjustable and horizontal drop-plate, with a number of pairs of seed-cells of different capacities made through it, as will be hereinafter explained.

To enable others skilled in the art to understand my invention, I will describe its construction and operation.

In the accompanying drawings, A represents the main or transporting frame of the machine, which is of a rectangular form, and is supported by two transporting-wheels, B B, whose axles C C do not extend across it. Rising from the rear cross-bar of said frame is a fixed standard, upon which is secured a seat for a person to ride. The front cross-bar *a* of this frame has its extremities rounded, and adapted to receive eyes, which are made through the upper ends of two backwardly inclined arms, *b b*, that are thus allowed to vibrate freely. These arms *b b* have rigidly secured to them a secondary frame, D, which carries the seed-distributing mechanism, and the runners H, and furrow-makers or colters I. The arms *b b* suspend the front end of the secondary frame D from the bar *a*, of the main frame, and also allow said frame D to rise and descend bodily, and accommodate itself to inequalities or undulations of surface over which the machine is drawn.

In rear of the secondary frame D, and secured rigidly across the main frame A, is a bar, to which the draft-pole L is secured, which pole L is carried over the front cross-bar *a*, and secured rigidly to it.

J is a treadle-frame, which is pivoted to the inside longitudinal bars of frame A at points forward to the axles C C, which frame consists of two levers, united at their rear ends by a foot-board, *s*, and having their front ends extended beneath a transverse bar of the secondary frame D so that by depressing the foot-board *s* the runners H and colters I will, with the frame D, be raised free from the ground, and when the foot-board is released the frame D will descend, and its runners H will rest upon the ground and conform to the hills and valleys passed over.

The runners H, which have wide bottoms, are attached to standards *c* by means of pivots *d*, and the rear ends of these runners are secured to the upwardly-turned shanks *e* of the colters I by means of screws *f*, pass through curved slots *g*, so that the runners can be adjusted and set nearer to or farther from the longitudinal bars of frame D, according as it may be desired to expose more or less of the colters I beneath the bottoms of these runners.

The colters I are rigidly attached to the frame D, their front ends being curved upwardly, so as to form the shank *e*, which are fastened to the longitudinal bars of frame D, and their rear ends being firmly secured to the front sides of the discharge-tubes G, as shown in the drawings.

The runners H are intended to drag on the surface of the ground, and the colters I to open the ground and leave furrows into which to drop the seeds.

It will be seen that by adjusting the rear ends of the runners H, by means of screws *f* and slots *g*, the depth of the furrows made by the colters can be regulated.

It will also be seen that by having the weight of the front end of the machine sustained by the runners upon the ground, very little weight will be upon the horses' necks while the machine is in operation.

The seed is discharged from the hoppers E by the action of the slide F, the ends of which pass through both hoppers, and to which slide a reciprocating motion is imparted by the hand-lever G.

The ends of the slide F are constructed with two mortises, *h*, passing horizontally through the slide in a transverse direction, and through these mortises secondary slides or drop-plates *i* pass, each one of which is provided with a series of seed-cells, *j*, arranged in pairs of different sizes, as shown in Fig. 4.

By moving the secondary slides *i* in a transverse direction, either pair of the seed-cells may be brought beneath the centers of the hoppers E, so as to receive seeds therefrom through the apertures *k*, through the upper parts of the slides, and to discharge the seeds through apertures *l* through the lower parts of the slides.

The drawing, Figs. 4 and 6, shows clearly the construction of the secondary slides or drop-plates *i* and the mortises *h* through the ends of the slide F.

By the different sizes of the seed-cells *j* through the secondary slides *i*, the quantity of seed discharged from the hoppers at every stroke of the slide F is regulated.

By thus constructing double slides, inclosing a stationary but transversely-adjustable drop-plate, it will be seen that when the upper slide is moved so as to cover one of the seed-cells *j*, the bottom slide is moved so as to allow the seeds to drop from such cell into the tube G′ beneath.

Each one of the tubes G′ is constructed with two channels, *m m*, as indicated in Fig. 5, converging downwardly, and terminating in a recess containing an oscillating valve, H′, and for each double stroke of the slide F the seeds are alternately deposited into one and then the other channel. From these channels *m m* the seeds drop upon a shelf, *n*, where they are retained momentarily by a double-winged valve, H′, until, by the return stroke of the slide F, the position of the said valve is changed so as to sweep the seeds previously deposited on the shelf *n* down into the furrow, and opening at the same time the second channel of the tube for another deposit of seeds on the shelf *n*.

Each valve H′ is operated by an arm, *o*, which extends from the seed-slide F, and which catches over the crank *p* at the upper extremity of the valve-stem *q*, so that the motion of said valve H′ depends entirely upon the said slide, and this valve oscillates between the wings *v* of the shoe I′, which forms the lower extremity of each seed-discharge tube G′.

The wings *v* prevent the clods of earth from falling upon the newly-deposited seeds.

The wheels B B operate as rollers in passing over the furrows in which the seeds have been deposited, and cover and solidify the soil.

Having described my invention, what I claim as new, and desire to secure by Letters Patent, is—

1. A treadle-frame, J, pivoted in front of the axles C C, and extending in rear of the same, in combination with the main wheel-frame A, and with a secondary frame, D, which is hung from the main frame, and provided with furrow-openers and seed-dropping devices, substantially as described.

2. The combination of the main frame A, pivoted secondary furrowing and seed-dropping frame D, treadle J, and the rigid draft-pole L, substantially in the manner and for the purpose described.

3. The oscillating valve H′, applied to the seed-tube G, substantially as described.

4. The stationary shelf *n*, in combination with valve H′, substantially as described.

5. The construction of the seed-tube G′ with channels *m*, terminating in a recess adapted to receive a valve, H′, and shelf *n*, substantially as described.

6. The transversely-adjustable drop-plate *i*, constructed substantially as described.

7. Double slides on each end of the seed-slide, in combination with a perforated intermediate drop-plate *i*, substantially as described.

8. The adjustable runners H, arranged in front of colters I, substantially as described.

9. The arrangement of the oscillating valve H′ and shelf *n*, in combination with the two channels *m* of the seed-tube G′, and with seed-distributing mechanism, constructed to operate substantially as described.

10. The arrangement of hinged adjustable runners H, secondary frame D, and lever J, in combination with the colters I and shoes I′, constructed and operating substantially as described.

11. The arrangement of the seed-hoppers, the operator's seat, and the seed-tubes, in the relation shown, so that the operator, when on his seat, can see the seed as it falls from the shelves of the tubes upon the ground, substantially as described.

JAMES ARMSTRONG, JR.

Witnesses:
DAVID J. WALKER,
JAS. D. HEATH.